United States Patent [19]

Hawkins

[11] Patent Number: 4,662,390

[45] Date of Patent: May 5, 1987

[54] WATER LEVEL CONTROLLER FOR A BOILER

[75] Inventor: Michael R. Hawkins, Mixbury, England

[73] Assignee: T. W. Ward Industrial Plant Limited, England

[21] Appl. No.: 820,688

[22] Filed: Jan. 21, 1986

[30] Foreign Application Priority Data

Jan. 24, 1985 [GB] United Kingdom ............... 8501805

[51] Int. Cl.$^4$ ..................... F16K 21/18; F22B 37/42
[52] U.S. Cl. ............................... 137/392; 122/448 R
[58] Field of Search ............... 122/448 R; 137/392; 73/304 C; 417/36

[56] References Cited

U.S. PATENT DOCUMENTS

| | | | |
|---|---|---|---|
| 2,477,511 | 7/1949 | Comb | 137/392 UX |
| 2,931,577 | 4/1960 | Bullen | 236/78 C |
| 3,520,638 | 7/1970 | McUmber et al. | 137/392 X |
| 4,530,372 | 7/1985 | Overton et al. | 73/304 C |

FOREIGN PATENT DOCUMENTS

| | | |
|---|---|---|
| 810554 | 3/1959 | United Kingdom . |
| 822900 | 11/1959 | United Kingdom . |
| 915948 | 1/1963 | United Kingdom . |
| 963306 | 7/1964 | United Kingdom . |
| 1086954 | 10/1967 | United Kingdom . |
| 1595427 | 8/1981 | United Kingdom . |
| 2094003 | 8/1982 | United Kingdom . |

*Primary Examiner*—William E. Wayner
*Attorney, Agent, or Firm*—Fuller, Puerner & Hohenfeldt

[57] ABSTRACT

A water level controller for a boiler has electrical probe means (capacitive or conductive) to be arranged in the boiler to detect electrically the water level therein. An oscillator circuit generates an oscillator signal which first and second circuit means receive. When a capacitance probe is used, the first circuit means has a variable gain amplifier in which the gain is determined by variations in the capacitance of the probe according to the water level. The second circuit means comprises a variable gain amplifier in which the gain is determined by a variable resistance the value of which is representative of the desired operating water level. Third circuit means obtains a difference signal resultant from the output signals of said first and second circuit means, which is representative of the difference between the actual water level in the boiler and the desired operating level of the water in the boiler. Relays open and close the water supply respectively. Fourth circuit means energize said relays to open or to close the water supply, in response to the difference signal.

10 Claims, 6 Drawing Figures

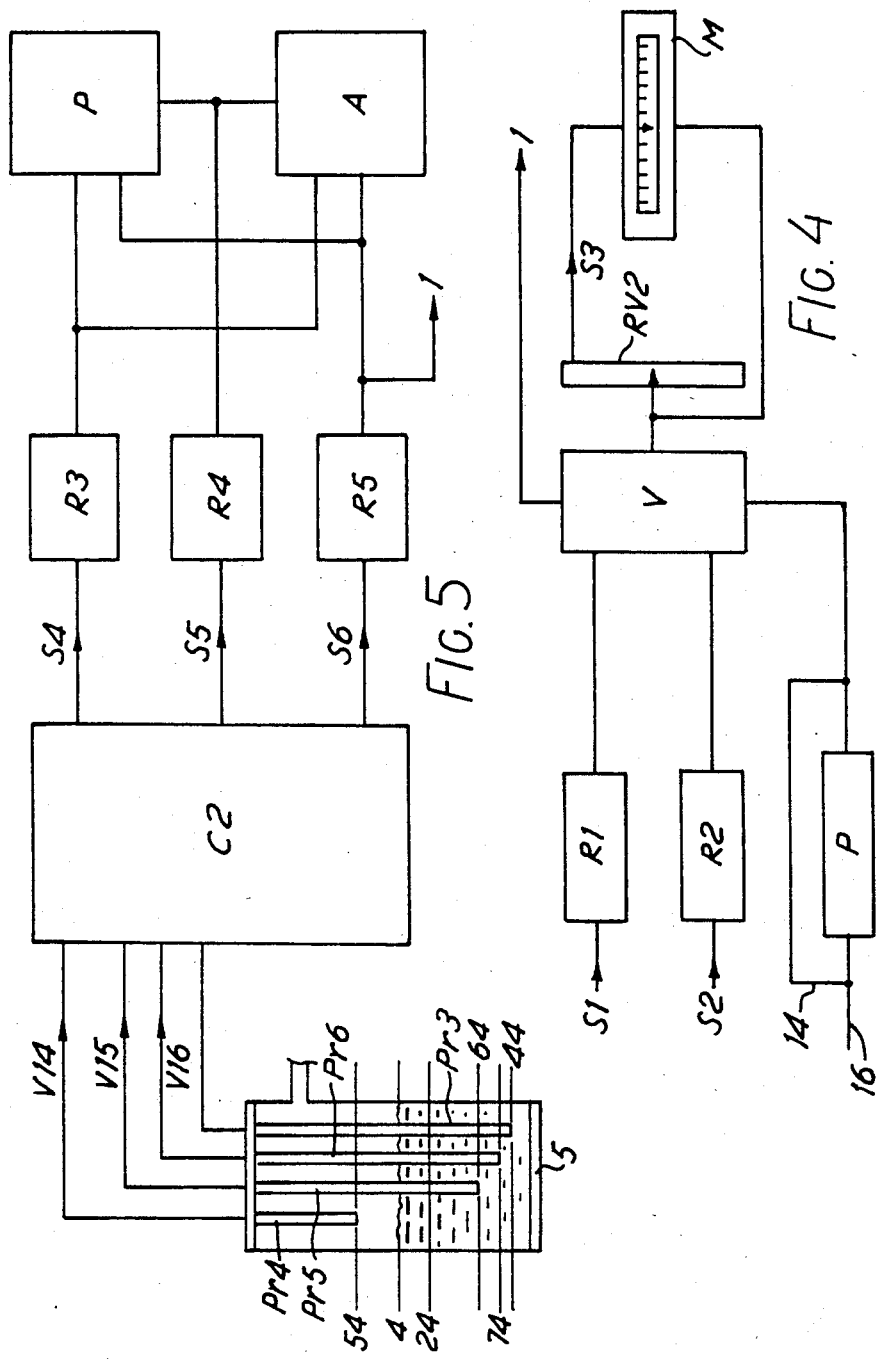

WATER LEVEL CONTROLLER FOR A BOILER

FIELD OF THE INVENTION

This invention relates to a water level controller for a boiler.

It is recognised that the level of water in industrial boilers, for example boilers used for steam generation, must be reliably monitored and controlled in order to avoid malfunction and, in the worst circumstances, boiler explosions.

PRIOR ART

Systems are known in which the water level in a control column or level control 'pot' is monitored by a float-actuated device to detect a fall in water level below the desired operating level. The float-actuated device is used to actuate a mercury switch whereby the pump for the water supply is energised when the water level falls. Water is then pumped to the boiler until the water level returns to the desired operating level. Such float-actuated devices have moving parts which are liable to failure and in due course result in shut-down of the boiler, the attendant risk of malfunction, and consequent costs for maintenance involving both labour and components.

OBJECTS AND SUMMARY OF THE INVENTION

It is an object of the present invention to provide an improved water level controller which monitors the operating water level without employing mechanisms involving moving parts.

A related object of the present invention is to provide embodiments in which additional controls are included to safeguard the boiler when due to malfunction the water level drops below the level at which the water feed is normally started.

A further object of the present invention is to provide embodiments of a water level controller which utilise a capacitance probe.

A still further object of the present invention is to provide embodiments of a water level controller in which the boiler water supply is controlled by a fuel control valve associated with a continuously acting pump.

A yet further object of the present invention is to provide embodiments of a water level controller in which the control range of the feed control valve is related to an operating range of water levels on a capacitance probe.

Another object of the present invention is to provide embodiments of a water level controller in which the effects of water bounce at the surface of the water in the boiler are eliminated.

A still further object of the present invention is to provide embodiments of a water level controller in which the setting of the desired operating level of the water in the boiler may be readily adjusted, a visual indication of same provided.

Yet another object of the present invention is to provide embodiments of a water level controller which provides a visual indication of the position of the feed control valve.

According to one aspect of the present invention there is provided a water level controller for a boiler, comprising first probe means to be arranged in the boiler to detect electrically the water level therein, circuit means electrically responsive to said probe means for generating a first electric signal when the water level falls below the desired operating level and a second electric signal when the water level returns to the desired operating level, first and second relay means responsive to said first and second electric signals respectively, the arrangement being such that, in use, said first relay means is employed to start the water feed to the boiler and the second relay means is employed to stop the water feed to the boiler.

In one embodiment, the first probe means comprises first, second and third probes each formed of conductive material, these probes being arranged in use such that the lower extremity of the first probe extends a predetermined distance below the desired operating level, the lower extremity of the second probe is located at the desired operating level and the third reference probe extends below said first and second probe extremities, whereby said circuit means is passive to the detection of a voltage signal through said reference probe and first probe and responsive to the water level falling below the lower extremity of said voltage signal whereby said first electrical signal is generated to cause said first relay means to start the water feed, and whereby said circuit means is passive to the absence of a voltage signal through said reference probe and said second probe when the water level is below said lower extremity of the second probe and responsive to the appearance of a voltage signal through said reference probe and second probe when the water level rises to contact the lower extremity of the second probe and generates said second electric signal to cause said second relay means to stop the water feed to the boiler.

In a second embodiment, the first probe means comprises a capacitance probe which is arranged in use to depend in the boiler water such that the length thereof extends throughout a range of water levels, said circuit means comprising a first capacitance circuit including said capacitance probe and which generates said first electric signal in response to the water level on the capacitance probe, said circuit means further comprising a second capacitance circuit for generating said second electric signal corresponding to the water level on the capacitance probe being at the desired operating level of the boiler, and wherein said first relay means is responsive to a signal derived from said first and second electric signals indicative that the boiler water level is below said operating level and said second relay means is responsive to a signal indicating that said first and second electric signals are equal indicating that the water level is at said operating level.

In embodiments, it is possible to arrange for said first and second relays to directly switch ON and OFF a feed pump for the water supply. According to a further aspect of the invention, the water level controller is provided for use with a continuously acting feed pump and operates a feed control valve which continuously regulates the water supply.

According to a third aspect of the present invention there is provided a water level controller for a boiler, comprising capacitance probe means to be arranged in the boiler to detect electrically the water level therein, oscillator means for generating an oscillator signal, first and second circuit means receiving said oscillator signal, said first circuit means comprising a variable gain amplifier in which the gain is determined by variations in the capacitance of said probe means according to the level of water at said probe means, said input oscillator signal being applied to a capacitance loop including said capacitance probe, said second circuit means comprising a variable gain amplifier in which the gain is determined by a resistance the value of which is representative of the desired operating level of the water in said boiler, third circuit means for obtaining a difference signal resultant from the output signals of said first and second circuit means, said difference being representative of the difference between the actual water level in the boiler and the desired operating level of the water in the boiler, a pair of relays to open and to close the water supply respectively, fourth circuit means for energising a respective one of said relays to open or to close the water supply in response to the difference signal.

In the third embodiment, the relays may actuate a reversing motor for a control feed valve for use with a continuously acting pump, said control feed valve may be associated with a slide potentiometer, a valve position signal being derived from said potentiometer and indicative of the position thereof, a proportional amplifier means being responsive to said valve position signal to produce comparator input signal, and comparator means to compare said difference signal with said comparator input signal such that when these signals are in balance the relays are inoperative owing to the actual and desired water levels being the same.

In this embodiment, the first and second circuit means may include variable amplifiers, and these may be parametric amplifiers. The third circuit means may comprise a pair of amplifier means to amplify respectively signals received from the first and second circuit means, one of the said amplifier means being an inverter; the third circuit means further including adding means for adding the signals from said amplifier means and thereby obtaining a difference signal, and being further provided with a phase sensitive detector to receive said difference signal and output a D.C. difference signal.

In the embodiments, the circuit means may be adapted to permit the setting of the desired operating water level. For this purpose the second capacitance circuit means includes a variable resistance associated with a calibration scale, the scale being calibrated to indicate the operating water level relative to a range on the probe.

In the embodiments, for the elimination of the effects of water bounce at the surface of the boiler water, the circuit means may incorporate means for preventing actuation of said relay means for a change in water level below a fixed increment.

In the embodiments, additional probe means may be provided for generating warning signals and for terminating pump feed when the water level falls to a given value or values below the operating level and/or rises to a given value above the operating level.

In embodiments using a valve to control a continuous feed, the valve may be associated with a slide potentiometer, and signal derived from said slide potentiometer energises a display meter which indicates the valve position.

BRIEF DESCRIPTION OF THE DRAWINGS

The foregoing and additional objects, features and advantages of the invention will more fully be understood from a consideration of the following detailed description of preferred embodiments of the invention, taken in conjunction with the accompanying drawings, in which:

FIG. 4 shows schematically an arrangement for using a continuous pump and a feed control valve with a water level controller of the present invention;

FIG. 5 shows schematically an arrangement for providing additional warning signals with a water level controller of the present invention; and, FIG. 6 shows schematically a water level controller according to a third embodiment of the present invention.

DESCRIPTION OF PREFERRED EMBODIMENTS

Figure 1:
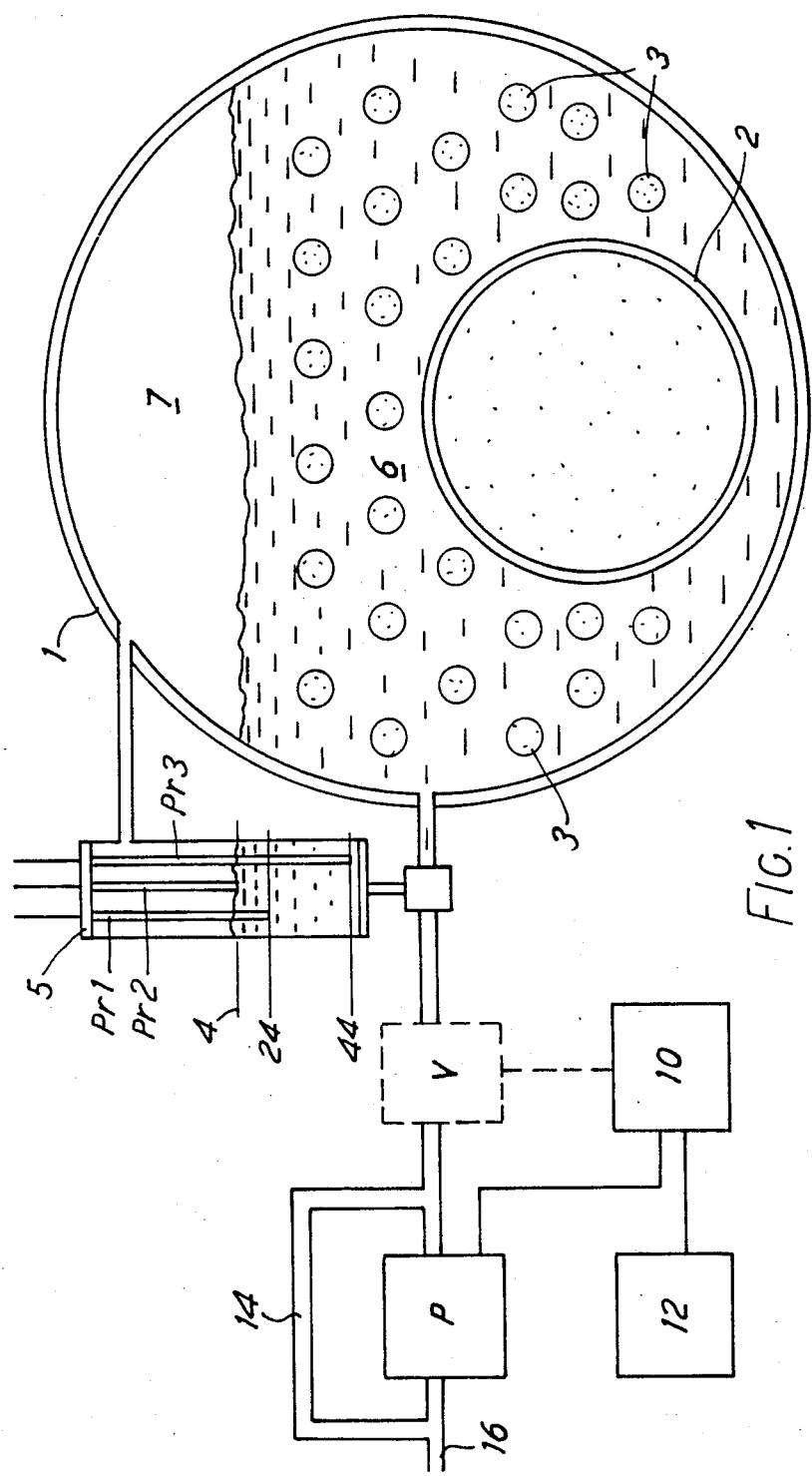
FIG. 1 is a view which shows schematically and in section a view of a water boiler incorporating a level control pot.

In FIG. 1 there is shown a boiler 1 fired by combustion gases which are arranged for multi-pass heating through conduit 2 and ducts 3. The water level 4 is at the desired operating level in the boiler 1 and the level control pot 5. Water 6 and steam 7 communicate from the boiler 1 to the level control pot 5. Water is fed to the boiler 1 by means of pump P which has its motor controller as will be hereinafter described. A water level controller 10 and an alarm 12 for giving visual and/or audio warnings of unacceptable water levels, are shown schematically. An optional feature (to be later described) is comprised by level control valve V and associated return feed line 14, which returns the pumped water to feed line 16 when valve V is shut.

Figure 2:
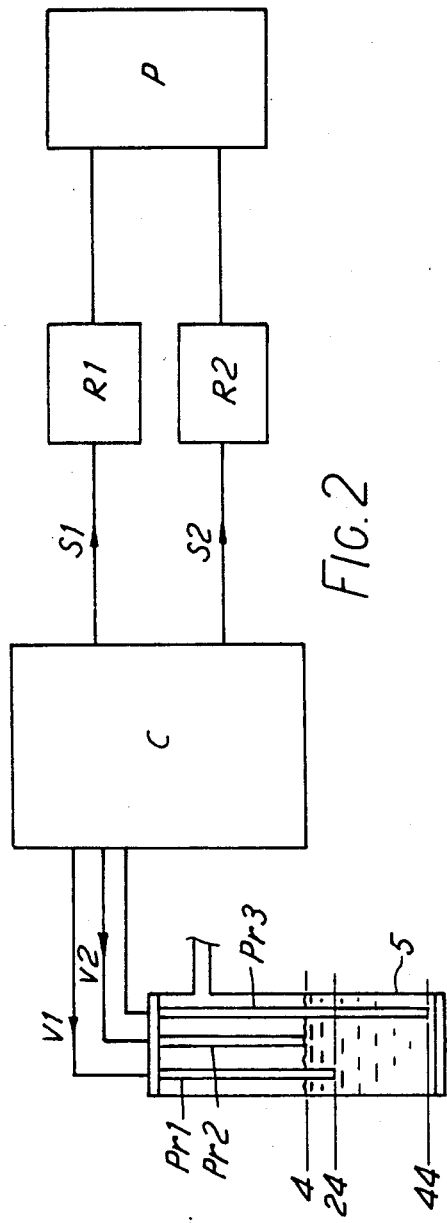
FIG. 2 shows schematically a water level controller according to one embodiment of the present invention.

In FIG. 2, a first embodiment of the water level controller 10 is illustrated. Probe means Pr 1, Pr 2, Pr 3 are arranged in level control plot 5 to detect electrically the water level therein. Circuit means C is electrically responsive to these probe means to generate a first electric signal S1 when the water level falls below the desired operating level 4 and a second electric signal S2 when the water level returns to the desired operating level 4. First and second electric signals S1, S2 respectively. The arrangement is such that, in use, first relay means R1 is employed to start the water feed to the boiler 1 by switching on pump P and the second relay means R2 is employed to stop the water feed to the boiler 1 by switching off the pump P.

Individual first, second and third probes Pr 1, Pr 2, Pr 3 are each formed of conductive material. These probes are arranged, in use, such that the lower extremity of the probe Pr 1 extends a predetermined distance to level 24 below the desired operating level 4, the lower extremity of the second probe Pr 2 is located at the desired operating level 4, and the lower extremity of the third, reference probe Pr 3 extends below the extremities of the probes Pr 1, Pr 2 to level 44. In practice the probes are of standard length and, when installed, cut to the required length.

Circuit means C applies a voltage signal V1 to a loop comprising reference probe Pr 3 and first probe Pr 1. When the boiler water level falls below level 24 at the lower extremity of first probe Pr 1 there is a resultant attenuation and termination of the voltage signal V1. Circuit means C is responsive to the absence of the voltage signal V1 to generate a signal S1. This signal S1 causes the first relay means R1 to start the pump P and thereby the water feed to the boiler 1.

Circuit means C also applies a voltage signal V2 to a loop comprising the reference probe Pr 3 and the second probe Pr 2. When the water level falls below level 4, namely the level of the extremity of the second probe Pr 2 the loop is broken and the circuit means detects the termination of signal V2. When the water level again rises to level 4, the loop through probes Pr 3, Pr 2 is again complete and voltage signal V2 restored. The circuit means C then generates a signal S2 to cause the relay means R2 to stop the pump P and thereby the water feed to boiler 1.

Figure 3:
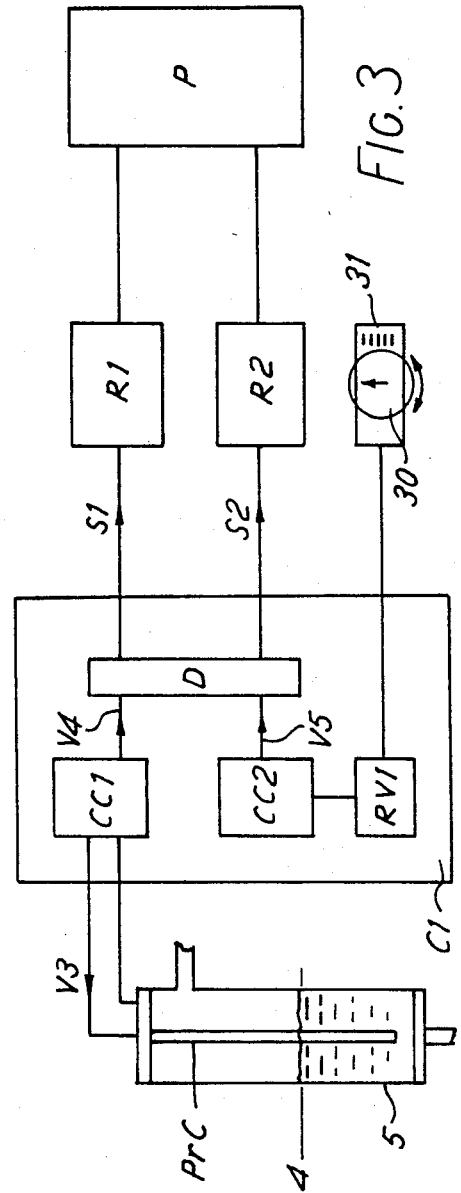
FIG. 3 shows schematically a water level controller according to one embodiment of the present invention.

In FIG. 3, a second embodiment of the water level controller 10 is illustrated. Probe PrC is arranged in level control pot 5 to detect electrically the water level therein. Circuit means C1 is electrically responsive to the changes in capacitance of the probe PrC to generate a first electric signal S1 when the water level falls below the desired operating level 4 and a second electric signal S2 when the water level returns to the desired operating level 4. First and second relay means R1, R2 are responsive to the first and second electric signals S1, S2 respectively. The arrangement is such that, in use, first relay means R1 is employed to start the water feed to the boiler 1 by switching on pump P and second relay means R2 is employed to stop the water feed to the boiler 1 by switching off the pump P.

The probe PrC is a capacitance probe and structurally is formed by a conductive probe (similar to those of probes Pr 1, Pr 3 of FIG. 2) but covered throughout its length with a sheath of insulating material such as polytretra flouroethylene (P.T.F.E.). This probe PrC forms part of a loop of a variable capacitance circuit in the circuit means C1, the loop including on the earth side the casing of the level control pot 5. The variation in capacitance is resultant from the changes in water level on the probe PrC. The circuit means C1 passing an alternative voltage V3 signal around said loop. The probe PrC depends through the range of water levels which will pertain in the boiler 2 and level control pot 5.

The circuit means C1 includes a first capacitance circuit CC1 of which, as stated, the probe PrC forms the variable capacitance. This circuit CC1 acts as a parametric amplifier with the probe PrC in the gain circuit. The circuit means C1 also includes a second capacitance circuit CC2 also comprising a parametric amplifier with a variable gain. The signal output V4 of circuit CC1 is representative of the water level on probe PrC and the signal output V5 of circuit CC2 is representative of the desired operating level in the boiler.

The circuit means C further includes circuit means D to which the signals V4 and V5 are applied. When the water level is below the operating level, the difference of signals V4 and V5 is detected by circuit means D and is output as signal S1. Signal S1 is applied to the relay means R1 which, in turn, is operative to energise the pump P and to start the water feed to the boiler 1. When the water level is returned to the operating level, the circuit means D is responsive to the equalization of the signals V4 and V5 to generate the signal S2. Signal S2 is applied to the relay means R2 which, in turn, is operative to de-energise the pump P and to stop the water feed to the boiler 1.

In the circuit means of this embodiment, a variable resistance RV1 is associated with the second capacitance circuit CC2. The output of circuit CC2 is a signal representing the operating level by varying the value of the resistance RV1 so the operating level can be varied.

Thus, resistance RV1 is associated with a manual control knob 30 and a calibrated scale 31. The scale is calibrated from 0 to 100% of an operating range over the length of the probe PrC. Thus, the operating level may be set within that range by the manipulation of the control knob 30.

In order to eliminate the effects of water bounce at the surface of the boiler water, the circuit means C1 incorporates means for preventing actuation of the first relay means R1 for a difference in water level below a fixed increment relative to the operating level. In the circuit means C of FIG. 3, this is accomplished by ensuring that when a signal V4 differs from the signal V5 by less than a given increment, then there is no output signal S1. Thus, when circuit means D compares signals V4, V5 the difference signal generated is required to be above a threshold value before an output signal S1 is generated.

Both water level controllers of FIGS. 2 and 3 are shown to directly control the pump P. In an alternative arrangement shown in FIG. 4, the relays R1 and R2 open and close respectively a level control valve V which controls the flow of water to the boiler 1 from a continuously acting pump P. When the valve V is shut, the water issuing from pump P returns via loop 14 to the input side 16 of pump P. This arrangement is particularly advantageous for use with a boiler since it ensures that, under all steaming conditions, the boiler is fed with the correct amount of water to suit the rate of evaporation and steam generation. It reduces peaks and troughs in steam supply and improves boiler efficiency. The valve V is associated with a slide potentiometer RV2. A position signal S3 is derived from the potentiometer RV2 and this signal energises a display meter M which indicates the valve position.

FIG. 5 illustrates additional controller means which may be incorporated with a water level controller of either the first or second embodiments of FIGS. 2 and 3. Additional conductive probes Pr 4, Pr 5. Pr 6, which are similar to probes Pr 1 to Pr 3 of FIG. 2, are provided in the same or another level control pot 5. Probe Pr 4 is set at high level 54 which corresponds to a high water level above the operating level. When the water level reaches level 54, signal S4 causes pump P to be de-energized (or valve V to close). This facility compensates if, due to malfunction the pump P continues to feed water after operating level 4 has been restored. Probes Pr 5, Pr 6 are set at levels 64, 74 below the level of probe Pr 1. If due to malfunction, the pump P does not operate to restore the water level in response to the level falling to level 24 (FIG. 2), then, if the water level continues to fall to levels 64 or even to level 74, firstly signal S5 is generated and secondly signal S6 is generated. Both signals S4 and S5 operate through relays R4 and R5 to stop/start pump P and trigger alarm A. Probe Pr 6 is a final back-up for probes Pr 1 and Pr 5. Signal S5 will also be employed to close down the boiler 1.

The manner in which circuit means C2 responds to signals V14 to V16 round respective loops Pr 4 and Pr 3, Pr 4 and Pr 3, Pr 6 and Pr 3 is analogous to that described for circuit means C in FIG. 2.

Figure 6:
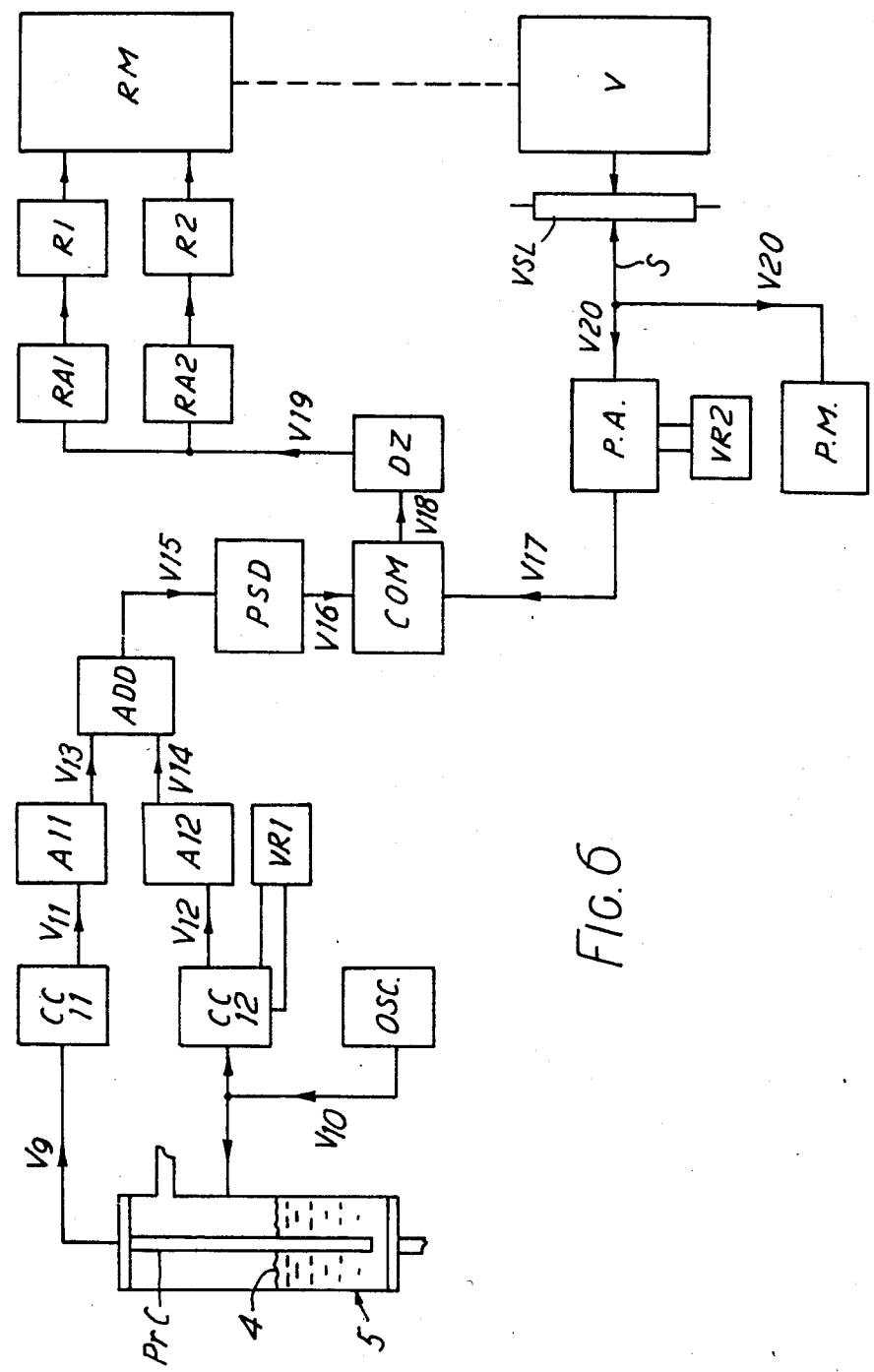

The preferred embodiment of a water level controller 10 embodying a capacitance probe PrC will now be described with reference to FIG. 6. In FIG. 6 the circuitry in general terms is broadly similar to that of FIG. 3 as modified by FIG. 4. In similar manner, the water supply to the boiler 1 (see FIG. 1) passes through a pump P and a valve V. The position of the valve V is determined by a reversing motor RM which is associated with relays R1 and R2 which, respectively, when actuated cause the reversing motor RM to drive the valve V to open and to close the valve.

As described in relation to FIG. 3, the capacitance probe PrC (of FIG. 6) is shown in a level control pot 5 to detect electrically the water level therein, and the desired operating level for the water in the boiler is indicated at 4. The probe PrC is of the type previously described.

In FIG. 6, the first part of the circuitry comprises an oscillator circuit means OSC, and first and second circuit means CC11 and CC12. The oscillator circuit means produce a signal V10 which is input to the circuit means CC11 and CC12. First circuit means CC11 has a capacitance loop which includes the capacitance probe PrC and the earth side of the control pot 5. The signal V9 passes round this loop. The first circuit means CC11 includes a variable gain amplifier, which in this embodiment is a parametric amplifier, the gain of which is determined by the capacitance of probe PrC which, in turn, varies according to the water level in the control pot 5. In fact, since the gain of the amplifier in circuit means CC11 is directly proportional to the capacitance of the probe PrC and the capacitance of the probe PrC is directly proportional to the water level, it follows that the output signal V11 of circuit means CC11 is proportional to water level in the control pot 5, and it may be called the actual water level signal V11. The second circuit means CC12, which also receives the oscillator signal V10, also includes a variable gain amplifier, which again in this embodiment is a parametric amplifier, the gain of which is determined by a level setting potentiometer or first variable resistance VR1. Potentiometer VR 1 is adjusted such that the value of its resistance in the circuit CC12 produces a desired output signal V12 therefrom. In fact, the potentiometer VR1 can be calibrated such that a visual indication is given of its setting, that setting corresponding to a position for the desired operating level of the water in the boiler 1 and control pot 5, within the range of adjustment on the potentiometer VR1 corresponding to a range of water levels or an operating band on the capacitance probe PrC. Thus, signal V12, which is adjustable, represents the desired operating level of the water in the boiler, and may be called the desired operating level signal.

In the next part of the circuitry of FIG. 6, comprises the third circuit means in which the difference of the actual water level signal V11 and the desired operating level signal V12 is obtained. In this embodiment, this is effected by providing a pair of amplifiers A11 and A12, the former amplifier A11 being an inverter. The A.C. signals V13 and V14 from these amplifiers are then added by component ADD to produce an A.C. difference signal V15. It will be readily appreciated that A.C. difference signal V15 is representative of the difference between the actual water level in the boiler (and control pot 5) and the desired operating level 4.

Next, the A.C. difference signal V15 is passed to a phase sensitive detector PSD which produces at its output a signal V16 which is a D.C. difference signal, the polarity of which indicates whether the actual water level is above or below the desired operating level 4.

The next part of the circuitry of FIG. 6 comprises the fourth circuit means for energising relays R1 and R2 (to be described). The first component of the fourth circuit means is a comparator circuit COM. This difference signal V16 is passed to the comparator circuit COM, which also receives a comparator input signal V17 (the source of which will be further described below) which is representative of the position of valve V and, thus, the status of the valve (opening or closing).

Comparator COM compares the difference signal V16 and the comparator input signal V17 and produces an output signal V18, which is a first relay energising signal representative of system condition in terms of the direction and amount by which the valve is required to move to open or to close for the purpose of attaining the desired operating level for the water in the boiler.

This first relay energising signal V18 passes through a threshold circuit DZ with an output signal V19. For small differences between the signals V16 and V17 (i.e. low values of the signal V18), the circuit DZ produces a zero output as signal V19. Thus, circuit DZ represents the means for preventing actuation of relays R1 and R2 by signal V19 for a change in the actual water level and relative to the desired operating level, which change is below a fixed increment. This facility avoids hunting by the valve V due to the effects of water bounce at the surface of the boiler water.

From the circuit DZ, the relay energising signal V19 passes to the relay amplifier circuits RA1 and RA2, which incorporate Schmidt triggers. The circuit RA1 is responsive to a positive signal indicating that the water level is below the desired operating level and that the valve V is required to be opened (or opened further) to attain the desired operating level. When energised circuit RA1 drives the relay R1 to energise the reversing motor RM in the direction to open the valve V. The circuit RA2 is responsive to a negative signal indicating that the position of valve V is more open than is necessary for the water feed to bring the water level up to the desired operating level. When energised, circuit RA2 drives the relay R2 to energise the reversing motor RM in the direction to close the valve V. Since the control circuitry has dynamic characteristics represented by the continuing comparison between difference signal V16 and comparator input signal V17 (representative of the valve position), the relays R1 and R2 are operated first to open valve V to extent necessary to restore the water level 4 and then to close the valve V so that the water level 4 is not exceeded. Thus, the operation of the relays R1 and R2 is a function both of the actual water level (represented by signal V9) and the feed control valve position (represented by signal V20), but in a novel manner achieved by the present circuitry to render a dynamic operation and optimise the valve position and hence water feed. Such a water level controller is especially suitable for ensuring that the boiler (under all steaming conditions) is fed with the correct amount of water to suit evaporation. This reduces peaks and troughs in steam pressure.

The valve V has an associated valve slide wire or slide potentiometer VSL and the position of the valve V determines the position of slide S. A D.C. voltage is applied across the valve slide wire VSL and a valve position signal V20 is generated. This valve position signal V20 is used as an input to a proportional amplifier PA and a panel or display meter PM which gives a visual indication of the valve position. The proportional amplifier PA has a variable gain, which is determined by the setting of a second variable resistance VR2. This setting of VR2 determines the control range of the comparator input signal V17 (derived from the valve position signal V20) for the valve control range representing the range of positions of the feed control valve V. Thus, this can be equalised with the range of the difference signal V16 and hence with the operating range of the capacitance probe PrC. By an empirical adjustment of the value of resistance VR2 the control range represented by the range of signal V17 can coincide with the operating range represented by the range of signal V16. When the difference signal V16 and comparator input signal V17 are in balance, the water level is at the desired operating level and the output from comparator COM is zero.

It will be appreciated that, by way of a fail-safe arrangement, an additional capacitance probe could be employed together with similar circuitry to that shown in FIG. 6 to provide twin independent water level controllers. The second controller could be coupled to the reversing motor RM, via its own relays.

Similarly, it is possible to employ the signal V18 to drive an audio and/or visual alarm if, for example, signal V18 exceeds a predetermined value. Thus, a second threshold circuit, similar to threshold circuit DZ (with a related threshold value), may provide an output signal similar to signal V19, when V18 exceeds a given value (or, alternatively, is below another given value) and this signal may energise such an alarm, for example, that designated 12 in FIG. 1. Further details of this modification will be apparent to those skilled in the art.

Alternatively, an additional probe PrC and associated circuitry may be provided for generating warning signals and for terminating water feed when the water level falls to a given value or values below the operating level and/or rises to a given value above the operating level. The associated circuitry will be similar to that of FIG. 6 from probe PrC to threshold circuit DZ, whose output V19 will be employed to generate a warning signal to energise the alarm 12 (see FIG. 1) and to shut down the pump P (see FIG. 1) by means of a further relay.

Thus, there has been described new and unique water level controllers for boilers. Although the invention has been described in terms of preferred embodiments, it will be apparent that various modifications may be made without departing from the true spirit and scope thereof as set forth in the following claims.

What is claimed is:

1. A water level controller for a boiler, comprising capacitance probe means to be arranged in the boiler to detect electrically the water level therein, oscillator means for generating an oscillator signal, first and second circuit means receiving said oscillator signal, said first circuit means comprising a variable gain amplifier in which the gain is determined by variations in the capacitance of said probe means according to the level of water at said probe means, said input oscillator signal being applied to a capacitance loop including said capacitance probe means, said second circuit means comprising a variable gain amplifier in which the gain is determined by a resistance the value of which is representative of the desired operating level of the water in said boiler, third circuit means for obtaining a difference signal resultant from the output signals of said first and second circuit means, said difference signal being representative of the difference between the actual water level in the boiler and the desired operating level of the water in the boiler, a pair of relays to open and to close the water supply respectively, fourth circuit means for energising a respective one of said relays to open or to close the water supply in response to the difference signal.

2. A water level controller as defined in claim 1, wherein the relays are adapted to actuate a reversing motor for a control feed valve for use with a continuously acting pump, said control feed valve being associated with a slide potentiometer, a valve position signal being derived from said potentiometer and indicative of the position thereof, a proportional amplifier means being responsive to said valve position signal to produce a comparator input signal, and comparator means to compare said difference signal with said comparator input signal such that when these signals are in balance the relays are inoperative owing to the actual and desired water levels being the same.

3. A water level controller as defined in claim 1, wherein the first and second circuit means are parametric amplifiers.

4. A water level controller as defined in claim 1, wherein the third circuit means comprises a pair of amplifier means to amplify respectively signals received from the first and second circuit means, one of the said amplifier means being an inverter; the third circuit means further including adding means for adding the signals from said pair of amplifier means to thereby obtain an A.C. difference signal, and a phase sensitive detector to receive said A.C. difference signal and output a D.C. difference signal.

5. A water level controller as defined in claim 1, wherein the second capacitance circuit means includes a variable resistance associated with a calibration scale, the scale being calibrated to indicate the operating water level relative to a range on the probe.

6. A water level controller as defined in claim 1, wherein, for the elimination of the effects of water bounce at the surface of the boiler water, the fourth circuit means incorporates means for preventing actuation of said relays for a change in water level relative to the desired operating level which change is below a fixed increment.

7. A water level controller as defined in claim 1, wherein additional probe means is provided for generating warning signals and for terminating pump feed when the water level falls to a given value or values below the operating level and rises to a given value above the operating level.

8. A water level controller as defined in claim 2, wherein the valve is associated with a slide potentiometer, and a signal derived from said slide potentiometer energises a display meter which indicates the valve position.

9. A water level controller as defined in claim 1, wherein said resistance in said second capacitance circuit is a first variable resistance whereby the setting of the desired operating level is variable within a range representative of an operating bond on the capacitance probe.

10. A water level controller as defined in claim 2, wherein a second variable resistance is associated with said proportional amplifier, the setting of said second variable resistance determining the range of said comparator input signal, which is derived from said valve position signal, for the valve control range representing the range of positions of the feed control valve, whereby the range of the difference signal input to the comparator and the range of the valve position signal input to the comparator as the comparator input signal from the proportional amplifier may be equalized, whereby the operating range on the probe corresponds to the feed control valve operating range.

* * * * *